United States Patent
Walsh et al.

(10) Patent No.: US 11,341,260 B2
(45) Date of Patent: May 24, 2022

(54) OPTIMIZING ALLOCATION OF ACCESS CONTROL IDENTIFIERS TO A CONTAINER

(71) Applicant: Red Hat, Inc., Raleigh, NC (US)

(72) Inventors: Daniel Walsh, Marlborough, MA (US); Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 268 days.

(21) Appl. No.: 16/808,498

(22) Filed: Mar. 4, 2020

(65) Prior Publication Data

US 2021/0279350 A1    Sep. 9, 2021

(51) Int. Cl.
G06F 17/30      (2006.01)
G06F 21/62      (2013.01)
G06F 16/25      (2019.01)

(52) U.S. Cl.
CPC ........ *G06F 21/6218* (2013.01); *G06F 16/254* (2019.01)

(58) Field of Classification Search
CPC .......... G06F 16/13; G06F 16/21; G06F 16/24; G06F 16/156; G06F 21/00; G06F 21/30; H04L 29/06823
See application file for complete search history.

(56) References Cited

U.S. PATENT DOCUMENTS

| | | | |
|---|---|---|---|
| 7,761,552 B2 | 7/2010 | Nakamura et al. | |
| 9,705,817 B2 | 7/2017 | Lui et al. | |
| 10,142,204 B2 | 11/2018 | Nickolov et al. | |
| 10,802,973 B1* | 10/2020 | Ratnakaram | G06F 16/273 |
| 2003/0200215 A1* | 10/2003 | Chen | G06F 21/10 |
| 2012/0233315 A1 | 9/2012 | Hoffman et al. | |
| 2012/0279350 A1* | 11/2012 | Ferrer | C21C 7/10 |
| | | | 75/10.64 |
| 2018/0247064 A1* | 8/2018 | Aronovich | G06F 21/6209 |

FOREIGN PATENT DOCUMENTS

KR    102013005 B1    8/2019

OTHER PUBLICATIONS

Graber, S., "Custom User Mapping in LXD Containers," Canonical Ltd., Jun. 15, 2017, https://ubuntu.com/blog/custom-user-mappings-in-lxd-containers.
Scrivano, G., "User Namespaces Support in Podman," Red Hat, Inc., May 24, 2018, https://www.projectatomic.io/blog/2018/05/podman-userns/.

* cited by examiner

*Primary Examiner* — Hung D Le
(74) *Attorney, Agent, or Firm* — Kilpatrick Townsend & Stockton, LLP

(57) ABSTRACT

Allocation of access control identifiers to a container can be optimized. For example, a system can determine a largest value for a particular type of access control identifier (ACID) associated with a container image by analyzing content of the container image, the container image being for deploying a container. Next, the system can determine an amount of the particular type of ACID to allocate to the container based on the largest value. The system can then allocate the amount of the particular type of ACID to the container.

20 Claims, 3 Drawing Sheets

OPTIMIZING ALLOCATION OF ACCESS CONTROL IDENTIFIERS TO A CONTAINER

TECHNICAL FIELD

The present disclosure relates generally to allocating computing resources. More specifically, but not by way of limitation, this disclosure relates to optimizing allocation of computing resources (e.g., access control identifiers) to a container.

BACKGROUND

Containers are relatively isolated virtual-environments that are typically deployed from image files, which are referred to herein as container images. Container deployment engines such as DOCKER can ingest the image files and interface with a host operating system (e.g., UNIX or LINUX) to deploy the containers. Such containers have gained popularity as a lightweight alternative to hypervisor-based virtualization.

DETAILED DESCRIPTION

Figure 1:
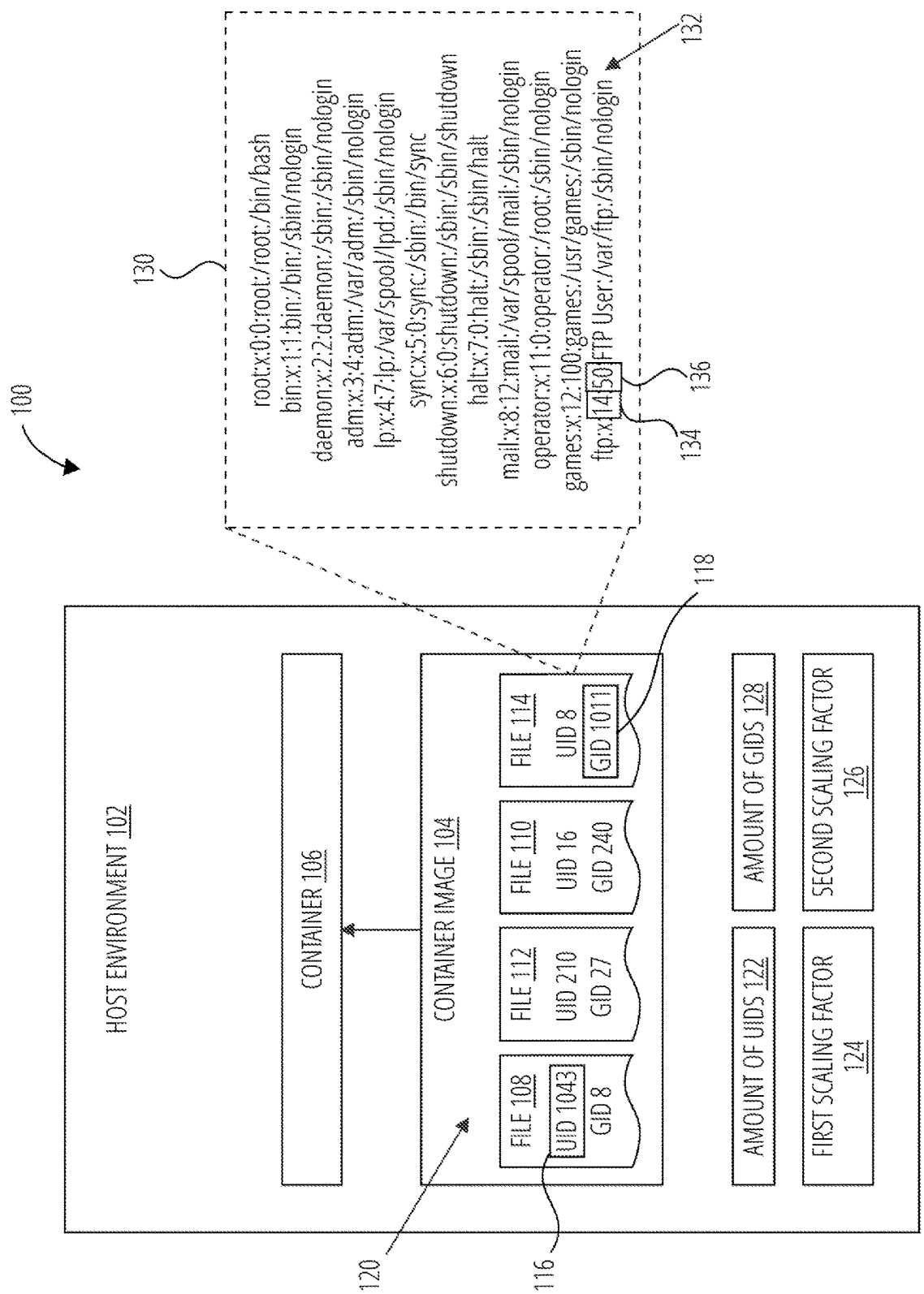
FIG. 1 is a block diagram of an example of a system for optimizing allocation of access control identifiers to a container according to some aspects of the present disclosure.

A host environment can typically allocate a default number of access control identifiers (ACIDs) to each container that the host environment deploys. For example, a host environment typically allocates 65,536 user identifiers to each container by default. A user identifier (UID) is a numerical value that identifies a user on a unix-like operating system for determining which system resources the user can access. A host environment also typically allocates 65,536 group identifiers to each container by default. A group identifier (GID) is a numerical value that identifies a group on a unix-like operating system for determining which system resources the group can access. The reason that host environments allocate so many of these ACIDs to each container is to ensure that the container has adequate resources to perform its functionality. But containers often only actually use far fewer of the ACIDs than are allocated to them by default, resulting in many excess ACIDs being allocated to containers. And since host environments typically have a maximum number of unique ACIDs available, allocating excess ACIDs to containers can unnecessarily limit system capabilities. For example, if a host environment has a maximum of 4 billion UIDs available and each container uses 65,536 UIDs, then the host environment can be limited to a maximum of 61,000 containers. This may not be enough containers in many contexts, such as in a cloud computing environments where thousands of customers may each be deploying hundreds or thousands of containers.

Some examples of the present disclosure can overcome one or more of the abovementioned problems by allocating ACIDs to a container based on the requirements of the container. This can enable the number of ACIDs allocated to each container to be optimized to prevent excess ACIDs from unnecessarily being allocated to the container, which in turn may allow for more containers to be deployed in a host environment.

As one particular example, a container image can include multiple layers, where each layer can include a respective set of files. And each file can have an associated UID and an associated GID, which may have been assigned to the file during the creation of the container image. In some examples, a system of the present disclosure can analyze some or all of the files in a single layer of the container image to determine each file's associated UID and GID. The system can then compare the determined UIDs to one another and the determined GIDs to one another, in order to identify the maximum UID value and the maximum GID value associated with the layer. The system can iterate this process for some or all of the other layers in the container image to determine the largest UID value (e.g., the UID having the largest numerical value) and the largest GID value (e.g., the GID having the largest numerical value) for the container image as a whole, which can be referred to as an ACID pair. The system can use the ACID pair to determine how many UIDs and GIDs to allocate to the container.

For example, if the largest UID value identified by the system is 14,307, then the system may determine that the same amount of UIDs (14,307) are to be allocated to the container. This ensures that the container has the amount of UIDs to perform its functionality, while avoiding allocating excess UIDs that are not needed. Alternatively, the system can determine the amount of UIDs to allocate to the container by multiplying the largest UID value by a scaling factor (e.g., 1.5). This can help ensure that the container has sufficient overhead available to account for unexpected situations that may use more UIDs. The system can also perform a similar process for the GIDs. For example, if the largest GID value identified by the system is 1,203, then the system may determine that the same amount of GIDs (1,203) are to be allocated to the container. Alternatively, the system can determine the amount of GIDs to allocate to the container by multiplying the largest GID value by a scaling factor, to help ensure that the container has sufficient overhead available to account for unexpected situations requiring more GIDs. The system can then allocate the determined amount of UIDs, determined amount of GIDs, or both to the container. It should be appreciated that while the above process is described with respect to UIDs and GIDs, the process can be applied to any number and type(s) of access control identifier(s).

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for optimizing allocation of access control identifiers to a container 106 according to some aspects of the present disclosure. The system 100 includes a host environment 102. The host environment 102 can include a single computing device or multiple computing devices. For example, the host environment 102 can be a cloud computing environment or a data grid formed from multiple computing nodes. The host environment 102 may execute any suitable operating system, such as a unix or Linux operating system.

The host environment 102 includes a container image 104 for deploying one or more containers, such as container 106. The container image 104 includes content 120, such as any number and combination of files 108-114. The files 108-114 may be included in a single layer of the container image 104 or spread among multiple layers of the container image 104. Each of the files 108-114 can have one or more types of ACIDs associated with it. For example, each of the files 108-114 depicted in FIG. 1 has a UID and a GID assigned to it (e.g., as a metadata attribute). Such ACIDs are typically assigned to files during the creation of a container image.

In some examples, the system 100 can determine an amount of a particular type of ACID to allocate to the container 106 by analyzing attributes of the files 108-114. For example, the system 100 can determine a respective UID assigned to each respective file by analyzing an ownership attribute of the file. The system 100 can then compare the UIDs to one another to determine which UID is the largest. In the example shown in FIG. 1, the file 108 has the largest UID value 116 of 1043. The system 100 can then determine the amount of UIDs 122 to allocate to the container 106 based on the largest UID value 116 assigned to the files 108-114. For example, the system 100 can determine that the amount of UIDs 122 to allocate to the container 106 is to be the same as the largest UID value 116, or can determine that the amount of UIDs 122 to allocate to the container 106 is to be a product of the largest UID value 116 and a first scaling factor 124 (e.g., 2.0). The system 100 can then allocate the determined amount of UIDs 122 to the container 106.

In one specific example, the container image 104 can include multiple layers, where each layer includes a respective set of files. The system 100 can analyze some or all of the files in one of the layers to determine a respective UID assigned to each respective file, and then compare the respective UIDs to one another to determine the maximum UID for the layer. For example, the system 100 can determine that the maximum UID for Layer 1 is 12,327. The system 100 can iterate this process for one or more additional layers of the container image 104 to determine the maximum UID associated with each of those layers. For example, the system 100 can determine that the maximum UID associated with Layer 2 is 17,320; the maximum UID associated with Layer 3 is 2,327; and the maximum UID associated with Layer 4 is 8,654. The system 100 can then determine the largest UID value 116 by comparing the maximum UIDs associated with the individual layers to one another. For example, the system 100 can determine that the largest UID value 116 associated with all four layers is 17,320. The system 100 can determine the amount of UIDs 122 to allocate to the container 106 based on the largest UID value 116.

Additionally or alternatively, the system 100 can determine an amount of a particular type of ACID to allocate to the container 106 by analyzing data from within one or more of the files 108-114. For example, the system 100 can extract the data 130 of file 114. The file 114 is an/etc/passwd file in the example shown in FIG. 1, but in other examples the file 114 could be an/etc/group file or any other suitable file that includes ACID information. The system 100 can then parse the data 130 into entries, such as entry 132 which includes "ftp:x:14:50:FTP User:/var/ftp:/sbin/nologin." In the example shown in FIG. 1, each entry is a single line in the data 130, but other entry formats are possible. After parsing the data 130 into entries, the system 100 can analyze each of the entries to determine one or more ACIDs corresponding to the entry. For example, in FIG. 1, the first number in each entry is a UID number, so the system 100 can determine that entry 132 has a UID of 14. The system 100 can then compare the UIDs to one another to determine the largest UID value 134 that is included within the file 114, which in this example is 14 from entry 132. The system 100 can then determine the amount of UIDs 122 to allocate to the container 106 based on the largest UID value 134 included in the file 114. For example, the system 100 can determine that the amount of UIDs 122 to allocate to the container 106 is to be the same as the largest UID value 134, or can determine that the amount of UIDs 122 to allocate to the container is a product of the largest UID value 134 and the first scaling factor 124. The system 100 can then allocate the determined amount of UIDs 122 to the container 106.

In some examples, the system 100 can determine the amount of UIDs 122 to allocate to the container 106 based on (i) the largest UID value 116 attributed to the files 108-114, and (ii) the largest UID value 134 within a particular file 114. For purposes of distinguishing these UID values from one another, the largest UID value 116 can be referred to as the "first largest UID value" and the largest UID value 134 can be referred to as the "second largest UID value." The system 100 can compare the first largest UID value to the second largest UID value to determine a greater of the two, which can be referred to as the target UID number. For example, if the first largest UID value is 11,237 and the second largest UID value is 14,330, then the system 100 can determine that the second largest UID value is the target UID number. The system 100 can then use the target UID number determine the amount of UIDs 122 to allocate to the container 106. For example, the system 100 can determine that the amount of UIDs 122 to allocate to the container 106 is to be the same as the target UID number, or can determine that the amount of UIDs 122 to allocate to the container is a product of the target UID number and the first scaling factor 124. The system 100 can then allocate the determined amount of UIDs 122 to the container 106.

The system 100 can additionally or alternatively perform the above process for other types of ACIDs. For example, the system 100 can determine a respective GID assigned to each respective file by analyzing an ownership attribute of the file. The system 100 can compare the GIDs to one another to determine which GID is the largest. In the example shown in FIG. 1, file 114 has the largest GID value 118 of 1011. The system 100 can then determine the amount of GIDs 128 to allocate to the container 106 based on the largest GID value 118 attributed to the files 108-114. For example, the system 100 can determine that the amount of GIDs 128 to allocate to the container 106 is to be the same as the largest GID value 118, or can determine that the amount of GIDs 128 to allocate to the container 106 is to be a product of the largest GID value 118 and a second scaling factor 126 (e.g., 1.4), which may be the same as or different from the first scaling factor 124. The system 100 can then allocate the determined amount of GIDs 128 to the container 106.

In one specific example, the container image 104 can include multiple layers, where each layer includes a respective set of files. The system 100 can analyze some or all of the files in one of the layers to determine a respective GID assigned to each respective file, and then compare the respective GIDs to one another to determine the maximum GID for the layer. For example, the system 100 can determine that the maximum GID for Layer 1 is 1,327. The system 100 can iterate this process for one or more additional layers of the container image 104 to determine the maximum GID associated with each of those layers. For example, the system 100 can determine that the maximum GID associated with Layer 2 is 320; the maximum GID associated with Layer 3 is 5,217; and the maximum GID associated with Layer 4 is 3,294. The system 100 can then determine the largest GID value 118 by comparing the maximum GIDs associated with the individual layers to one another. For example, the system 100 can determine that the largest GID value 118 associated with all four layers is 5,217. The system 100 can determine the amount of GIDs 128 to allocate to the container 106 based on the largest GID value 118.

Additionally or alternatively, the system 100 can determine the amount of GIDs 128 based on the data 130 in the file 114. For example, the second number in each entry can be a GID number—thus, the entry 132 includes a GID of 50. The system 100 can the compare the GIDs to one another to determine the largest GID value 136 included within the file 114, which in this example is 50. The system 100 can then determine the amount of GIDs 128 to allocate to the container 106 based on the largest GID value 136 included in the file 114. For example, the system 100 can determine that the amount of GIDs 128 to allocate to the container 106 is to be the same as the largest GID value 136, or can determine that the amount of GIDs 128 to allocate to the container is a product of the largest GID value 136 and the second scaling factor 126. The system 100 can then allocate the determined amount of GIDs 128 to the container 106.

In some examples, the system 100 can determine the amount of GIDs 128 to allocate to the container 106 based on (i) the largest GID value 118 attributed to the files 108-114, and (ii) the largest GID value 136 from within a particular file 114. For purposes of distinguishing these from one another, the largest GID value 118 can be referred to as the "first largest GID value" and the largest GID value 136 can be referred to as "the second largest GID value." The system 100 can compare the first largest GID value to the second largest GID value to determine a greater of the two, which can be referred to as the target GID number. For example, if the first largest GID value is 1,530 and the second largest GID value is 2,201, then the system 100 can determine that the second largest GID value is the target GID number. The system 100 can then use the target GID number determine the amount of GIDs 128 to allocate to the container 106. For example, the system 100 can determine that the amount of GIDs 128 to allocate to the container 106 is to be the same as the target GID number, or can determine that the amount of GIDs 128 to allocate to the container is a product of the target GID number and the second scaling factor 126. The system 100 can then allocate the determined amount of GIDs 128 to the container 106.

While many of the examples above are described with reference to UIDs and GIDs, those examples are not intended to be limiting. Other examples may employ similar steps to those described above for other types of access control identifiers.

Figure 2:
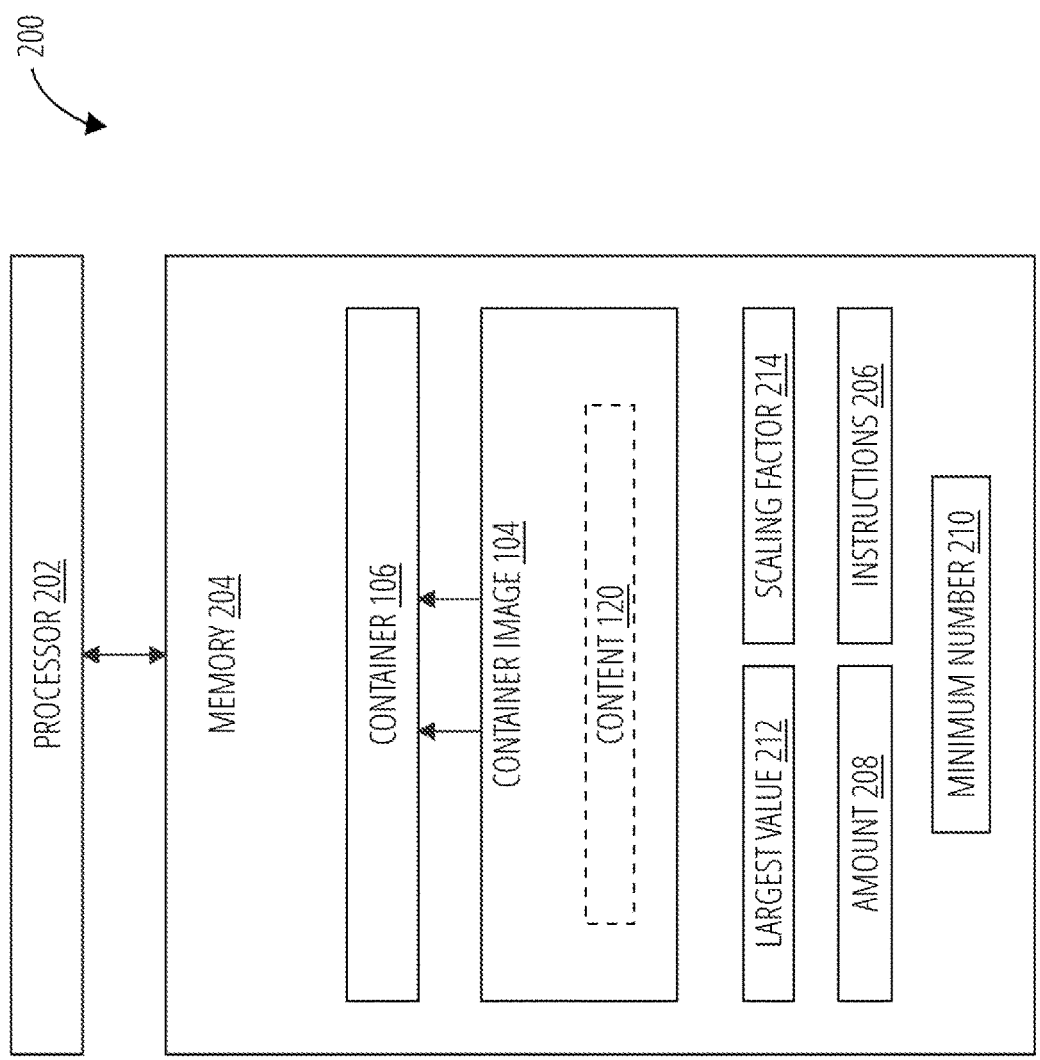
FIG. 2 is a block diagram of another example of a system for optimizing allocation of access control identifiers to a container according to some aspects of the present disclosure.

FIG. 2 is a block diagram of another example of a system 200 for optimizing allocation of access control identifiers to a container 106 according to some aspects of the present disclosure. The system 200 includes a processor 202 communicatively coupled to a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, etc.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium from which the processor 202 can read instructions 206. A non-transitory computer-readable medium can include electronic, optical, magnetic, or other storage devices capable of providing the processor 202 with the instructions 206 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 206.

In some examples, the processor 202 can determine a largest value 212 for a particular type of access control identifier (ACID) associated with a container image 104 by analyzing content 120 of the container image 104. An access control identifier is a numeric or alphanumeric identifier for controlling access to system resources. Two exemplary types of ACIDs include a user identifier and a group identifier. After determining the largest value 212, the processor 202 can determine an amount 208 of the particular type of ACID to allocate to the container 106 based on the largest value 212. The processor 202 can then allocate that amount 208 of the particular type of ACID to the container 106.

Figure 3:
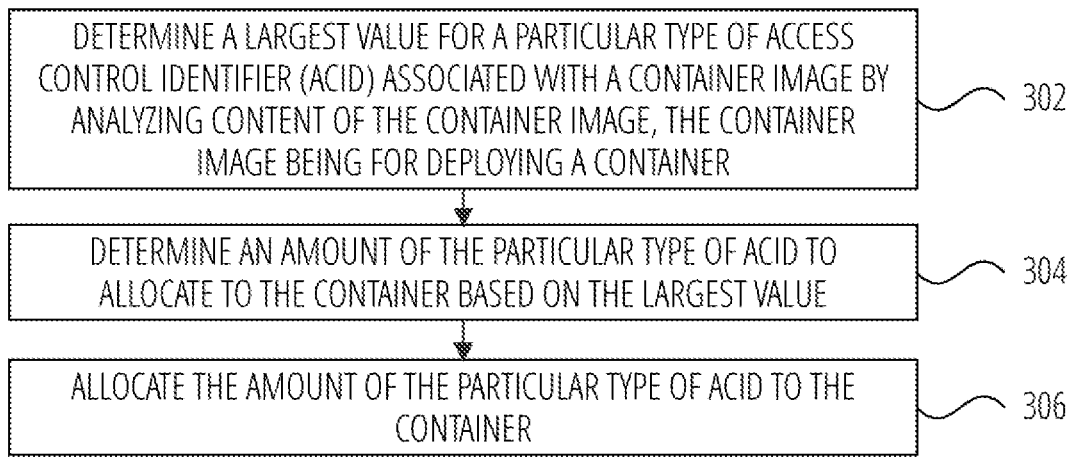
FIG. 3 a flow chart of an example of a process for optimizing allocation of access control identifiers to a container according to some aspects of the present disclosure.

FIG. 3 a flow chart of an example of a process for optimizing allocation of access control identifiers to a container according to some aspects of the present disclosure. While FIG. 3 depicts a certain sequence of steps for illustrative purposes, other examples can involve more steps, fewer steps, different steps, or a different order of the steps than is depicted in FIG. 3, and the steps can be performed using any of the techniques described herein. The steps of FIG. 3 are described below with reference to components of FIG. 2.

In block 302, the processor 202 determines a largest value 212 for a particular type of access control identifier (ACID) associated with a container image 104 by analyzing content 120 of the container image 104, where the container image 104 is for deploying a container 106. The processor 202 can determine the largest value 212 using any of techniques described above.

For example, the processor 202 can extract data from a file of the container image 104, parse the data into entries, and determine a plurality of ACIDs of the particular type by analyzing the entries. The processor 202 can then determine the largest value 212 for the particular type of ACID by comparing the plurality of ACIDs to one another. As another example, the processor 202 can determine the largest value 212 by analyzing attributes of a plurality of files within the container image to determine a plurality of ACIDs of the particular type assigned to the plurality of files. Each file among the plurality of files can be assigned a respective ACID of the particular type. The processor 202 can then determine the largest value from among the plurality of ACIDs. As yet another example, the processor 202 can employ one or more heuristic models to determine which file(s) to analyze in the container image 104. The processor 202 can then analyze those files using either of the two approaches described above (e.g., by extracting data from the files and/or by analyzing attributes of the files) to determine the largest value 212 for the particular type of ACID. The heuristic models may enable the processor 202 to more intelligently and rapidly identify the most useful files for determining the largest value 212.

In block 304, the processor 202 determines an amount 208 of the particular type of ACID to allocate to the container 106 based on the largest value 212. The processor 202 can determine the amount 208 using any of techniques described above. For example, the processor 202 can use the largest value 212 as the amount 208. Alternatively, the processor 202 can determine the amount 208 by multiplying the largest value 212 by a scaling factor 214 (e.g., the first scaling factor 124 or the second scaling factor 126 of FIG. 1).

In some examples, the processor 202 can determine a minimum number 210 of the particular type of ACID to be allocated to the container 106. The minimum number 210 can be preset, for example, by a user of the system 200. The processor 202 can then determine if the amount 208 is less than the minimum number 210. If so, then the processor 202 can increase the amount 208 (e.g., to match or exceed the minimum number 210). Otherwise, the processor 202 may not adjust the amount 208 based on the minimum number 210.

In some examples, the processor 202 can determine the amount 208 based on the equation MAX(L1, L2, MIN_SIZE), where L1 is a first largest ACID value (e.g., the largest UID value 116 assigned to the files 108-114), L2 is a second largest ACID value (e.g., the largest UID value 134 included within the file 114), and MIN_SIZE is the minimum number 210. In this context, "first largest" and "second largest" are terms used to differentiate the ACID values from one another, rather than to indicate their relative sizes to one another. In accordance with the above equation, the processor 202 can select the largest of L1, L2, and MIN_SIZE for use as the amount 208.

In block 306, the processor 202 allocates the amount 208 of the particular type of ACID to the container 106. In some examples, this may involve the processor 202 interfacing with a kernel of an operating system to cause the kernel to allocate the determined amount of the particular type of ACID to the container 106.

In some examples, the processor 202 can repeat the above process for multiple different types of ACIDs. For instance, the processor 202 can perform the above process at least twice in order to determine an ACID pair. The ACID pair can include, for example, the largest UID value and the largest GID value associated with the container image 104. The processor 202 can then allocate UIDs and GIDs to the container 106 based on the ACID pair. It should be appreciated that the processor 202 can perform the above process any number of times to allocate any number of ACIDs to the container 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A computer-implemented method comprising:
   determining a largest value for a particular type of access control identifier (ACID) associated with a container image by analyzing content of the container image, the container image being for deploying a container;
   determining an amount of the particular type of ACID to allocate to the container based on the largest value; and
   allocating the amount of the particular type of ACID to the container.

2. The computer-implemented method of claim 1, wherein the particular type of ACID is a user identifier.

3. The computer-implemented method of claim 1, wherein the particular type of ACID is a group identifier.

4. The computer-implemented method of claim 1, wherein the content is within a file included in the container image, and wherein determining the largest value comprises:
   extracting data from the file;
   parsing the data into entries;
   determining a plurality of ACIDs of the particular type by analyzing the entries, each of the entries including a respective ACID of the particular type; and
   determining the largest value for the particular type of ACID by comparing the plurality of ACIDs to one another.

5. The computer-implemented method of claim 1, wherein determining the largest value comprises:
   analyzing attributes of a plurality of files within the container image to determine a plurality of ACIDs of the particular type assigned to the plurality of files, wherein each file among the plurality of files is assigned a respective ACID of the particular type; and
   determining the largest value from among the plurality of ACIDs.

6. The computer-implemented method of claim 1, further comprising:
   determining the amount of the particular type of ACID by multiplying the largest value by a scaling factor.

7. The computer-implemented method of claim 1, further comprising:
   determining a minimum number of the particular type of ACID to be allocated to the container;
   determining that the amount is less than the minimum number; and
   based on determining that the amount is less than the minimum number, increasing the amount to be greater than or equal to the minimum number.

8. A system comprising:
   a processor; and
   a memory comprising instructions that are executable by the processor for causing the processor to:
      determine a largest value for a particular type of access control identifier (ACID) associated with a container image by analyzing content of the container image, the container image being for deploying a container;
      determine an amount of the particular type of ACID to allocate to the container based on the largest value; and
      allocate the amount of the particular type of ACID to the container.

9. The system of claim 8, wherein the particular type of ACID is a user identifier.

10. The system of claim 8, wherein the particular type of ACID is a group identifier.

11. The system of claim 8, wherein the content is within a file included in the container image, and wherein the memory further includes instructions that are executable by the processor for causing the processor to determine the largest value by:
   extracting data from the file;
   parsing the data into entries;

determining a plurality of ACIDs of the particular type by analyzing the entries, each of the entries including a respective ACID of the particular type; and determining the largest value for the particular type of ACID by comparing the plurality of ACIDs to one another.

12. The system of claim 8, wherein the memory further includes instructions that are executable by the processor for causing the processor to determine the largest value by:

analyzing attributes of a plurality of files within the container image to determine a plurality of ACIDs of the particular type assigned to the plurality of files, wherein each file among the plurality of files is assigned a respective ACID of the particular type; and determining the largest value from among the plurality of ACIDs.

13. The system of claim 8, wherein the memory further includes instructions that are executable by the processor for causing the processor to:

determine the amount of the particular type of ACID by multiplying the largest value by a scaling factor.

14. The system of claim 8, wherein the memory further includes instructions that are executable by the processor for causing the processor to:

determine a minimum number of the particular type of ACID to be allocated to the container;

determine that the amount is less than the minimum number; and based on determining that the amount is less than the minimum number, increase the amount to be greater than or equal to the minimum number.

15. A non-transitory computer-readable medium including program code that is executable by a processor for causing the processor to:

determine a largest value for a particular type of access control identifier (ACID) associated with a container image by analyzing content of the container image, the container image being for deploying a container;

determine an amount of the particular type of ACID to allocate to the container based on the largest value; and allocate the amount of the particular type of ACID to the container.

16. The non-transitory computer-readable medium of claim 15, wherein the particular type of ACID is a user identifier.

17. The non-transitory computer-readable medium of claim 15, wherein the particular type of ACID is a group identifier.

18. The non-transitory computer-readable medium of claim 15, wherein the content is within a file included in the container image, and further comprising program code that is by the processor for causing the processor to determine the largest value by:

extracting data from the file;

parsing the data into entries;

determining a plurality of ACIDs of the particular type by analyzing the entries, each of the entries including a respective ACID of the particular type; and determining the largest value for the particular type of ACID by comparing the plurality of ACIDs to one another.

19. The non-transitory computer-readable medium of claim 15, further comprising program code that is executable by the processor for causing the processor to determine the largest value by:

analyzing attributes of a plurality of files within the container image to determine a plurality of ACIDs of the particular type assigned to the plurality of files, wherein each file among the plurality of files is assigned a respective ACID of the particular type; and determining the largest value from among the plurality of ACIDs.

20. The non-transitory computer-readable medium of claim 15, further comprising program code that is executable by the processor for causing the processor to:

determine the amount of the particular type of ACID by multiplying the largest value by a scaling factor.

* * * * *